US007724721B2

(12) United States Patent
Lim et al.

(10) Patent No.: US 7,724,721 B2
(45) Date of Patent: May 25, 2010

(54) FRAME COMMUNICATION APPARATUS AND METHOD IN BROADBAND WIRELESS COMMUNICATION SYSTEM

(75) Inventors: Eun-Taek Lim, Suwon-si (KR); Jung-Min Ro, Seoul (KR); Jae-Hyuk Jang, Deagu (KR); Young-Bin Chang, Anyang-si (KR); Young-Kwon Cho, Suwon-si (KR); Young-Kyun Kim, Sungnami-si (KR); Dong-Seek Park, Yongin-si (KR); Joon-Young Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 966 days.

(21) Appl. No.: 11/497,519

(22) Filed: Aug. 2, 2006

(65) Prior Publication Data

US 2007/0060149 A1 Mar. 15, 2007

(30) Foreign Application Priority Data

Aug. 2, 2005 (KR) .................. 10-2005-0070488

(51) Int. Cl.
*H04J 1/00* (2006.01)
(52) U.S. Cl. .................. 370/343; 370/208; 370/480
(58) Field of Classification Search ............... 370/338, 370/436, 437, 465, 470, 471, 472, 473, 474, 370/475, 476, 478, 208, 210, 343, 344, 480
See application file for complete search history.

(56) References Cited

U.S. PATENT DOCUMENTS

| | | | | |
|---|---|---|---|---|
| 5,550,829 A | * | 8/1996 | Wang | 370/311 |
| 6,407,993 B1 | * | 6/2002 | Moulsley | 370/347 |
| 7,035,285 B2 | * | 4/2006 | Holloway et al. | 370/474 |
| 7,095,708 B1 | * | 8/2006 | Alamouti et al. | 370/208 |
| 2001/0031639 A1 | * | 10/2001 | Makipaa | 455/450 |
| 2003/0103525 A1 | * | 6/2003 | Wahl | 370/465 |
| 2005/0096051 A1 | * | 5/2005 | Lee et al. | 455/438 |
| 2005/0122996 A1 | * | 6/2005 | Azenkot et al. | 370/477 |
| 2006/0018332 A1 | * | 1/2006 | Kakani et al. | 370/428 |
| 2006/0034174 A1 | * | 2/2006 | Nishibayashi et al. | 370/235 |
| 2007/0047432 A1 | * | 3/2007 | Cho et al. | 370/203 |
| 2009/0092153 A1 | * | 4/2009 | Howard et al. | 370/474 |

FOREIGN PATENT DOCUMENTS

| | | |
|---|---|---|
| KR | 2005-0014315 A | 2/2005 |
| KR | 2005-0014319 A | 2/2005 |
| KR | 10080887 B1 | 11/2005 |
| WO | WO 2005/015775 A1 | 2/2005 |

* cited by examiner

*Primary Examiner*—Chi H. Pham
*Assistant Examiner*—Kevin Mew
(74) *Attorney, Agent, or Firm*—Roylance, Abrams, Berdo & Goodman, LLP

(57) ABSTRACT

A frame communication apparatus and method for a broadband wireless communication system are provided that employ a transmitter. In the transmitter, a control channel generating unit generates burst allocation information including a receiver identification (ID) with respect to a transmission packet, a burst generating unit constructs data burst by adding a header including a traffic ID to the transmission packet, and a transmitting unit transmits the burst allocation information and the data burst. An existing connection ID (CID) is subdivided into a user ID (UID) and a traffic ID (TID). The UID and the TID are recorded in a map channel message and a medium access control (MAC) header, respectively. Accordingly, an amount of information contained in a downlink map (DL-MAP) and uplink map (UL-MAP), and an amount of the MAC header of a data packet can be reduced.

47 Claims, 11 Drawing Sheets

FRAME COMMUNICATION APPARATUS AND METHOD IN BROADBAND WIRELESS COMMUNICATION SYSTEM

CROSS-REFERENCE TO RELATED PATENT APPLICATION

This application claims the benefit under 35 U.S.C. §119(a) to a Korean Patent Application filed in the Korean Intellectual Property Office on Aug. 2, 2005 and assigned Serial No. 2005-70488, the entire disclosure of which is hereby incorporated by reference.

BACKGROUND OF THE INVENTION

1. Field of the Invention

The present invention relates generally to frame communication apparatus and method in a broadband communication system. More particularly, the present invention relates to an apparatus and method for reducing a frame overhead in a wireless communication system using an Orthogonal Frequency Division Multiple Access (OFDMA) scheme.

2. Description of the Related Art

Many wireless communication technologies have been proposed for high speed mobile communication. Among the technologies, Orthogonal Frequency Division Multiplexing (OFDM) is considered as the most potential next generation wireless communication technology. For example, Institute of Electrical and Electronics Engineers (IEEE) 802.16 based Wireless Metropolitan Area Network (WMAN) employs the OFDM technology as a standard specification.

FIG. 1 is a diagram of a frame structure in a conventional OFDMA system.

Referring to FIG. 1, data transmission units of conceptual frequency and time domains in the OFDMA standard are subchannel and symbol, respectively. A minimum data unit that can be transmitted to one user (terminal) consists of one subchannel and one symbol. A vertical axis represents index of a subchannel that is a frequency resource allocation unit. One frame consists of (L+1) number of subchannels from $s^{th}$ subchannel to $(s+L)^{th}$ subchannel. A horizontal axis represents index of OFDM symbol that is a time resource allocation unit. One frame consists of (M+1) number of downlink OFDM symbols, from $k^{th}$ downlink OFDM to $(k+M)^{th}$ downlink OFDM symbol, and N number of uplink OFDM symbols, from $(k+M+1)^{th}$ uplink OFDM symbol to $(k+M+N)^{th}$ uplink OFDM symbol. A Transmit/receive Transition Gap (TTG) exists between the downlink and the uplink. The TTG is a time guard region.

In the OFDMA frame, the downlink interval includes a preamble, a frame control header (FCH), a downlink map (DL-MAP), an uplink map (UL-MAP), and downlink bursts (DL-bursts). The uplink interval includes uplink bursts (UL-bursts). The preamble is used for providing users with time synchronization, frequency synchronization, and cell information. The FCH contains information for decoding the DL-MAP. The DL-MAP contains information indicating which user data the DL-bursts transmitted from a base station are, and which region the user data are located in within the frame. The UL-MAP contains information on the UL-bursts transmitted from the user terminals.

One burst includes at least one subchannel and one symbol. Order of the symbol is physically identical to that of time, so that $k^{th}$ symbol, $(k+1)^{th}$ symbol, ..., and $(k+M+N)^{th}$ symbol are arranged in sequence. On the other hand, $s^{th}$ subchannel and $(s+1)^{th}$ subchannel may or may not be physically adjacent to each other. Because of characteristics of the OFDM technology, the signal has a frequency selective characteristic when passing through a radio channel. Therefore, the subchannels are constructed with subcarriers that are not physically adjacent to each other.

The process of mapping the actual physical subcarriers to the subchannels to construct one logical subchannel is referred to as a subchannel allocation. IEEE 802.16 OFDMA standard uses several subchannel allocation schemes, including a diversity subchannel allocation scheme and an Adaptive Modulation and Coding (AMC) subchannel allocation scheme. The diversity subchannel allocation scheme also includes a Full Usage of Subcarrier (FUSC) and a Partial Usage of Subcarrier (PUSC). The diversity subchannel allocation scheme can well cope with a radio channel having frequency selective characteristic by scattering the physical subcarriers of the logical subchannels. Meanwhile, the AMC subchannel allocation scheme constructs the subchannel with the subcarriers physically adjacent to one another. The AMC subchannel allocation scheme can determine the subchannels having good channel situations among the frequency selective subchannels and increase the throughput by changing the subchannel modulation and the channel coding.

As described above, the IEEE 802.16 OFDMA system adaptively copes with the radio channel environment by using various subchannel allocation schemes, and maximizes the degree of freedom in the frame structure by constructing the uplink and downlink bursts of the frame through the allocation of at least one subchannel and at least one symbol.

However, as the degree of freedom increases, control information to be transmitted also increases. Therefore, when a plurality of user data are mixed within the frame, control information notified to the user through the DL-MAP and the UL-MAP serves as the overhead. As one example, in a 2084-Fast Fourier Transform (FFT) mode having a bandwidth (BW) of 10 MHz, at least 43 bits are required to inform one user of the data location in the frame. The 43 bits include "CID (16 bits)+starting point of data (14 bits)+data size (13 bits)". If adding the subchannel allocation scheme and other necessary control information, control information that must be actually transmitted will greatly increase. When there are a lot of users, a small amount of data can be merely transmitted.

In addition, the data packets of the DL-burst are several users' packets using the same Modulation and Coding Scheme (MCS) level. The users' own data location cannot be accurately known only by the location of the DL-burst notified from the DL-MAP. Therefore, as illustrated in FIG. 2, CID (16 bits) identical to that used in the MAP channel to discern the user's own data is included in a header of user data (packet). Because the same information (CID) is recorded in the header of each data packet as well as the MAP channel, the data throughput decreases.

Accordingly, there is a need for an improved apparatus and method for increasing data throughput in a wireless communication system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for efficiently using wireless resources of time and frequency domains in an OFDMA system.

Another aspect of exemplary embodiments of the present invention is to provide an apparatus and method for reducing frame overhead in an OFDMA system.

A further aspect of exemplary embodiments of the present invention is to provide a frame communication apparatus and method in an OFDMA system.

A further aspect of exemplary embodiments of the present invention is to provide an apparatus and method for constructing channels in an OFDMA system.

A further aspect of exemplary embodiments of the present invention is to provide an apparatus and method for reducing overhead of a control channel in an OFDMA system.

A further aspect of exemplary embodiments of the present invention is to provide an apparatus and method for reducing overhead of a traffic channel in an OFDMA system.

According to one aspect of exemplary embodiments the present invention, a transmitter of a broadband wireless communication system includes a control channel generating unit for generating burst allocation information including a receiver ID with respect to a transmission packet; a burst generating unit for constructing data burst by adding a header including a traffic ID to the transmission packet; and a transmitting unit for transmitting the burst allocation information and the data burst.

According to another aspect of exemplary embodiments of the present invention, a receiver of a broadband wireless communication system includes a control channel recovering unit for recovering information of a received control channel, determining whether a receiver ID exists in the recovered information, and acquiring allocation information of a data burst, which is to be inputted to the receiver, using the information of the control channel when the receiver ID exists; a receiving unit for receiving traffic data in a corresponding time-frequency domain according to the acquired allocation information; and a traffic recovering unit for acquiring a traffic ID by recovering a header of the received traffic data.

According to a further aspect of exemplary embodiments of the present invention, a transmitting method in a transmitter of a broadband wireless communication system, in which burst allocation information including a receiver ID is generated with respect to a transmission packet, and the burst allocation information is transmitted; data burst is constructed by adding a header including a traffic ID to the transmission packet; and the data burst is mapped into a corresponding resource area according to the burst allocation information, and the mapped data burst is transmitted.

According to a further aspect of exemplary embodiments of the present invention, a receiving method in a receiver of a broadband wireless communication system, in which information of a received control channel is recovered, and whether a receiver ID exists in the recovered information is determined; when the receiver ID exists in the recovered information, allocation information of a data burst is recovered, which is to be inputted to the receiver, using the information of the control channel; traffic data in a corresponding time-frequency domain is received according to the acquired allocation information; and a traffic ID is acquired by recovering a header of the received traffic data.

BRIEF DESCRIPTION OF THE DRAWINGS

The above and other objects, features and advantages of certain exemplary embodiments of the present invention will be more apparent from the following detailed description taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A following description will be made relating to an apparatus and method for reducing a frame overhead in an OFDM (OFDMA) based broadband wireless communication system. Although the description will be based on the downlink for convenience of explanation, it will be apparent that uplink map information and uplink burst can be constructed in the same way.

Figure 1:
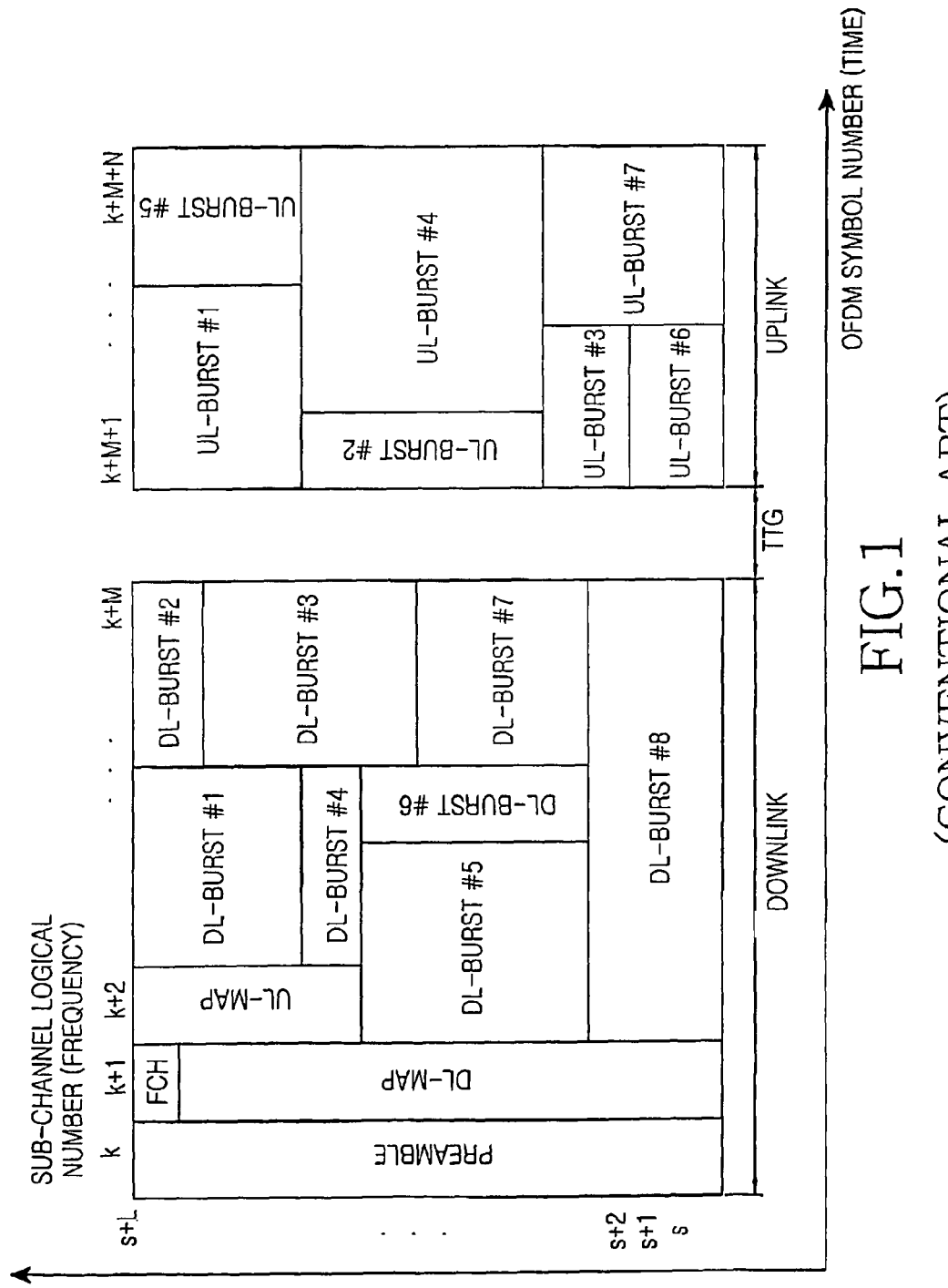
FIG. 1 is a diagram of a frame structure in a conventional OFDMA system.
Figure 2:
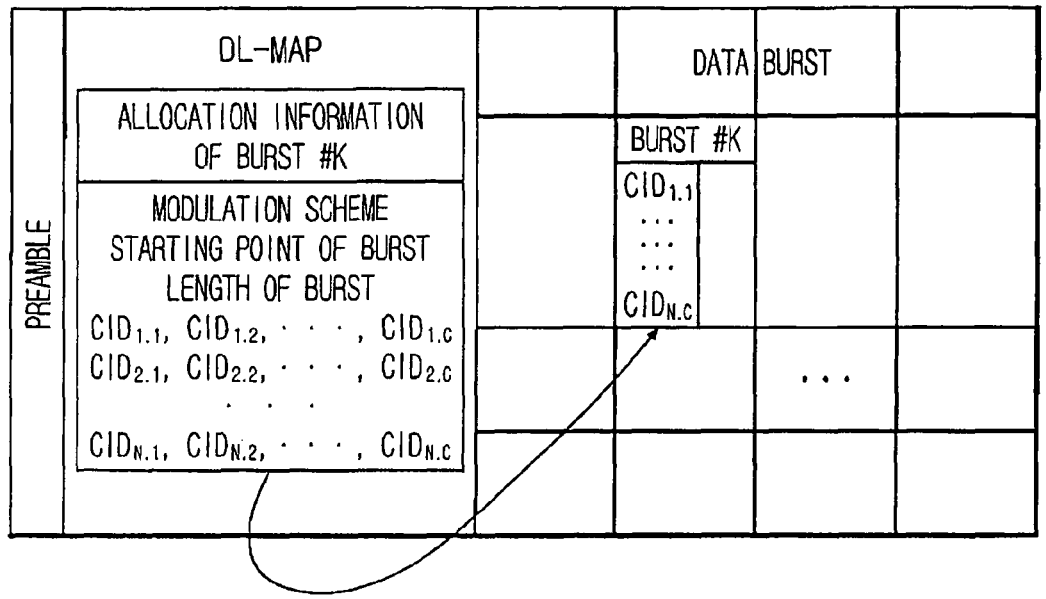
FIG. 2 is a diagram of a map channel structure in a conventional OFDMA system.
Figure 3:
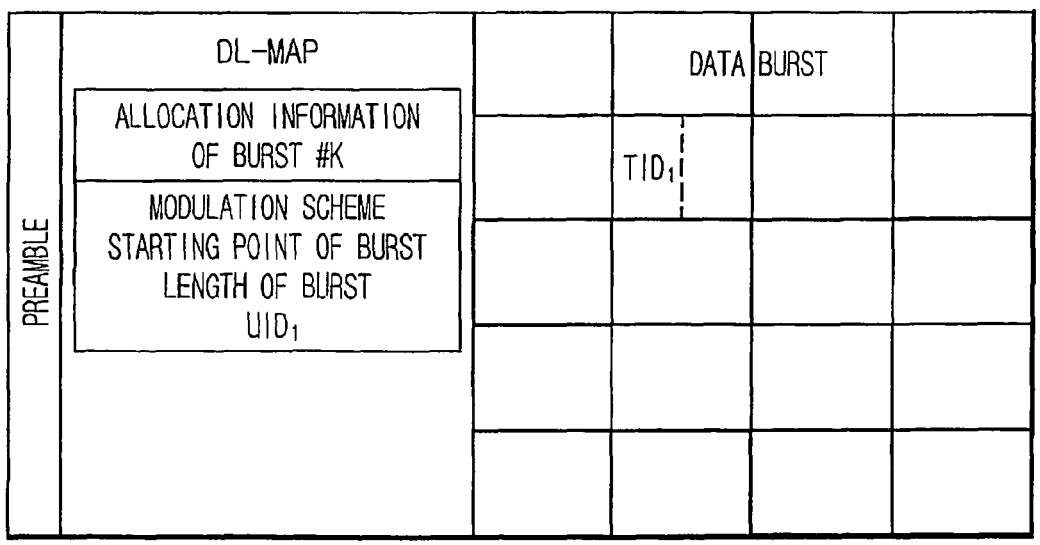
FIG. 3 is a diagram of a map channel structure in an OFDMA system according to an exemplary embodiment of the present invention.

FIG. 3 is a diagram of a map channel structure in an OFDMA system according to an exemplary embodiment of the present invention.

Referring to FIG. 3, the map channel according to an exemplary embodiment of the present invention includes allocation information of each burst (Burst#). $K^{th}$ burst allocation information includes a modulation level (MCS level) used in the $K^{th}$ burst, a starting point of the $K^{th}$ burst (symbol offset, subchannel offset), a length of the $K^{th}$ burst (number of symbols, number of subchannels), and a user identification (UID)

of a user who will receive the K$^{th}$ burst. A traffic ID (TID) indicates the kind of service recorded in a header of each packet loaded on the K$^{th}$ burst.

The UID (for example, 8 bits) and the TID (for example, 8 bits) are generated from a media access control (MAC) layer. When data is transmitted to an arbitrary user, the UID and the TID are recorded in a message of a map channel and a header (MAC header) of a user packet, respectively. The user determines whether the UID exists in the incoming MAP channel message. When the UID exists, the user receives a packet in a corresponding burst region. The header of the received packet is analyzed in the MAC layer. The kind of service is determined from the TID recorded in the header. Because the number of users allocated to one frame is not large in practice, an amount of the map channel information does not increase greatly even though the burst is divided based on the users, instead of the MCS levels.

Table 1 shows the ID recorded in the map channel and the ID recorded in the data burst with respect to one user, when the CID is used according to the related art.

TABLE 1

| ID Recorded in MAP channel | ID Recorded in Data Burst |
| --- | --- |
| CID (6 bits) | CID (16 bits) |

Assuming that the number of users allocated to one frame is N, a total amount of resource the CID occupies in the map channel is expressed as Equation (1):

$$\sum_{user=1}^{N} (16 \text{ bits} \times N_{user,connection}) \quad (1)$$

where $N_{user,connection}$ represents the number of connections allocated to each user.

When the CID is recorded in the header of the packet loaded on the burst, a total amount of resource is also calculated using Equation (1). The total amount of the resource may be changed according to the MCS level used for each channel (for example, map channel, traffic channel, and the like). In the case where the CID is recorded in the map channel and the data burst, if the total amount of resource the CID occupies is recalculated considering the MCS level, the result is expressed as Equation (2):

$$\frac{\sum_{user=1}^{N} (16 \text{ bits} \times N_{user,connection})}{MOD_{MAP}} + \frac{\sum_{user=1}^{N} (16 \text{ bits} \times N_{user,connection})}{MOD_{DATA}} \quad (2)$$

where $MOD_{MAP}$ represents the MCS level of the map channel, and $MOD_{DATA}$ represents the MCS level of the burst channel.

Table 2 shows the ID recorded in the map channel and the ID recorded in the data burst with respect to one user, when the UID and the TID are used according to the present invention.

TABLE 2

| ID Recorded in MAP channel | ID Recorded in Data Burst |
| --- | --- |
| UID (8 bits) | TID (8 bits) |

Assuming that the number of users allocated to one frame is N, a total amount of resource the UID occupies in the map channel is expressed as Equation (3):

$$\sum_{user=1}^{N} (8 \text{ bits} \times N_{user,connection}) \quad (3)$$

where $N_{user,connection}$ represents the number of connections allocated to each user.

When the TID is recorded in the header of the packet loaded on the burst, a total amount of resource is also calculated using Equation (3). The total amount of the resource may be changed according to the MCS level used for each channel. In the case where the UID and the TID are recorded in the map channel and the data burst, if the total amount of resource the UID and the TID occupy is recalculated considering the MCS level, the result is expressed as Equation (4):

$$\frac{\sum_{user=1}^{N} (8 \text{ bits} \times N_{user,connection})}{MOD_{MAP}} + \frac{\sum_{user=1}^{N} (8 \text{ bits} \times N_{user,connection})}{MOD_{DATA}} \quad (4)$$

where $MOD_{MAP}$ represents the MCS level of the map channel, and $MOD_{DATA}$ represents the MCS level of the burst channel.

Comparing Equation (2) of the related art with Equation (4) of the present invention, an amount of time-frequency resource required is reduced by half, assuming that the number of the users and the number of connections per user are equal to each other and the MCS levels are equal to each other.

Figure 4:
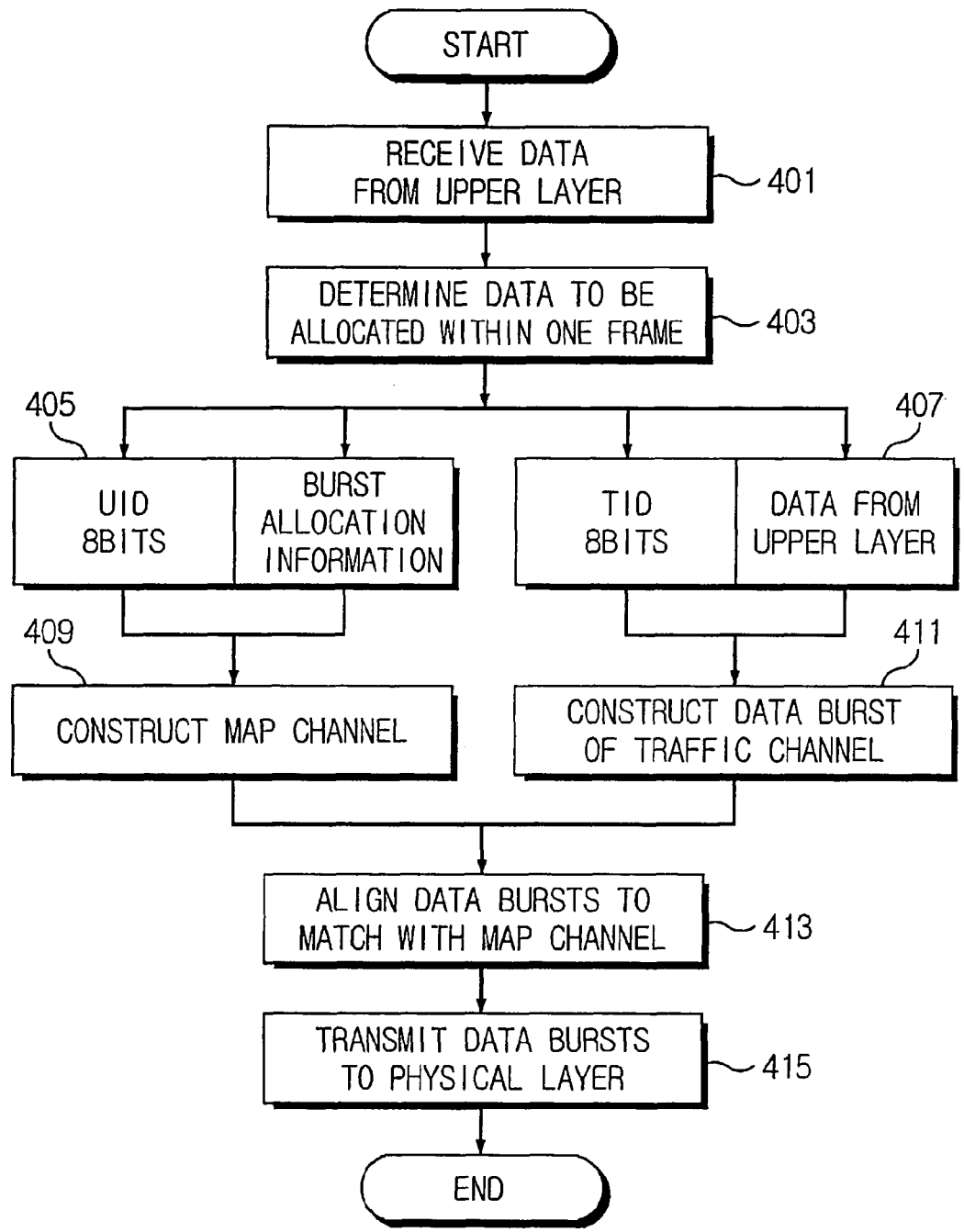
FIG. 4 is a flowchart illustrating a method for constructing a frame in the OFDMA system according to an exemplary embodiment of the present invention.

FIG. 4 is a flowchart illustrating a method for constructing a frame in the OFDMA system according to an exemplary embodiment of the present invention. Because the frame is generally constructed in a MAC layer, it will be assumed for convenience of description that all operations are performed in the MAC layer.

Referring to FIG. 4, the MAC layer receives user packets from an upper layer in step 401. In step 403, the MAC layer determines the user packets to be allocated to a current frame through scheduling.

In step 405, the MAC layer generates burst allocation information (for example, DL-MAP_IE) with respect to each data burst on which the determined user packets are loaded. As described in FIG. 3, the burst allocation information includes the MCS level, the starting point of the burst (symbol offset, subchannel offset), the length of the burst (number of symbols, number of subchannels), and the user identification (UID) of a user who will receive the burst. In step 407, the MAC layer generates the TID indicating the kind of service with respect to each user packet.

In step 409, the MAC layer constructs the map channel message using the burst allocation information. In step 411, the MAC layer constructs the data burst by adding an MAC header containing the TID and other control information in front of each user packet. Although it has been assumed that the data burst is constructed using one user packet (MAC PDU), it is apparent that the data burst can also be constructed using a plurality of user packets.

When the map channel message and the bursts of the traffic channel are constructed, the MAC layer aligns the bursts according to the map channel message in step 413, and transmits the map channel message and the aligned bursts to a physical layer in step 415. The frame data transmitted to the physical layer are processed such that they can be transmitted at a wireless period, and then are transmitted through an antenna.

Figure 5:
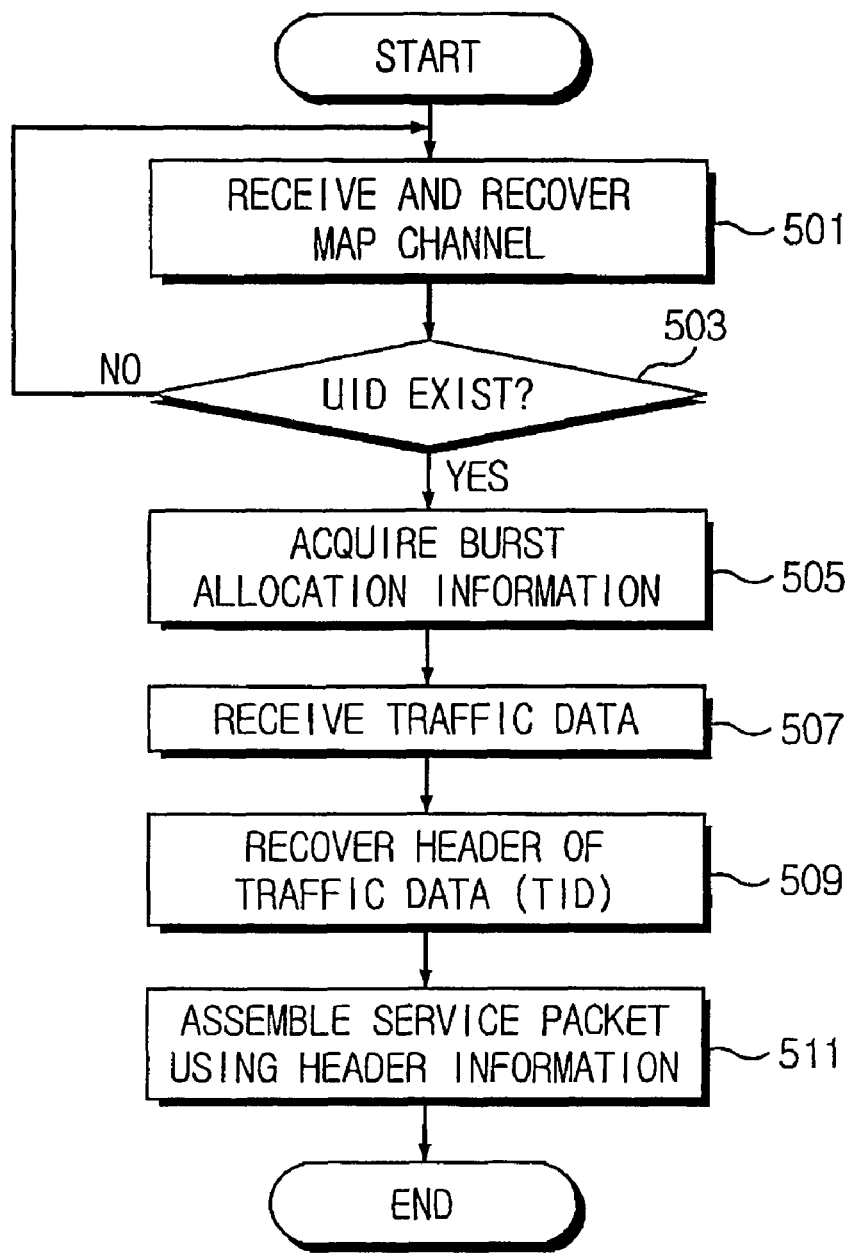
FIG. 5 is a flowchart illustrating a method for receiving a frame in the OFDMA system according to an exemplary embodiment of the present invention.

FIG. 5 is a flowchart illustrating a method for receiving a frame in the OFDMA system according to an exemplary embodiment of the present invention.

Referring to FIG. 5, a receiver receives a map channel in a preset domain (time-frequency domain) of a frame and recovers information of the received map channel in step 501. The information recovery of the map channel is performed in the MAC layer.

In step 503, the receiver determines whether an UID allocated from a base station (cell) exists in the information of the map channel. When the UID does not exist, the process returns to step 501 to receive a next frame.

In step 505, when the UID exists, the receiver extracts allocation information of the burst on which the traffic data (packet) of the receiver is loaded. The burst allocation information includes the MCS level used in the burst, the starting point of the burst, and the length of the burst (occupied frequency bandwidth, occupied time bandwidth).

In step 507, the receiver receives the traffic data (data burst) using the burst allocation information. That is, the traffic data is received by demodulating and decoding the data received through the corresponding time-frequency domain into the MCS level.

In step 509, the receiver acquires TID indicating the kind of service and other control information by recovering the header of the received traffic data. The information recovery of the header is performed in the MAC layer.

In step 511, the receiver assembles the received traffic data into a service packet (service data unit (SDU)) by using the header information, and processes the service packet through a corresponding upper layer (for example, IP layer).

Figure 6:
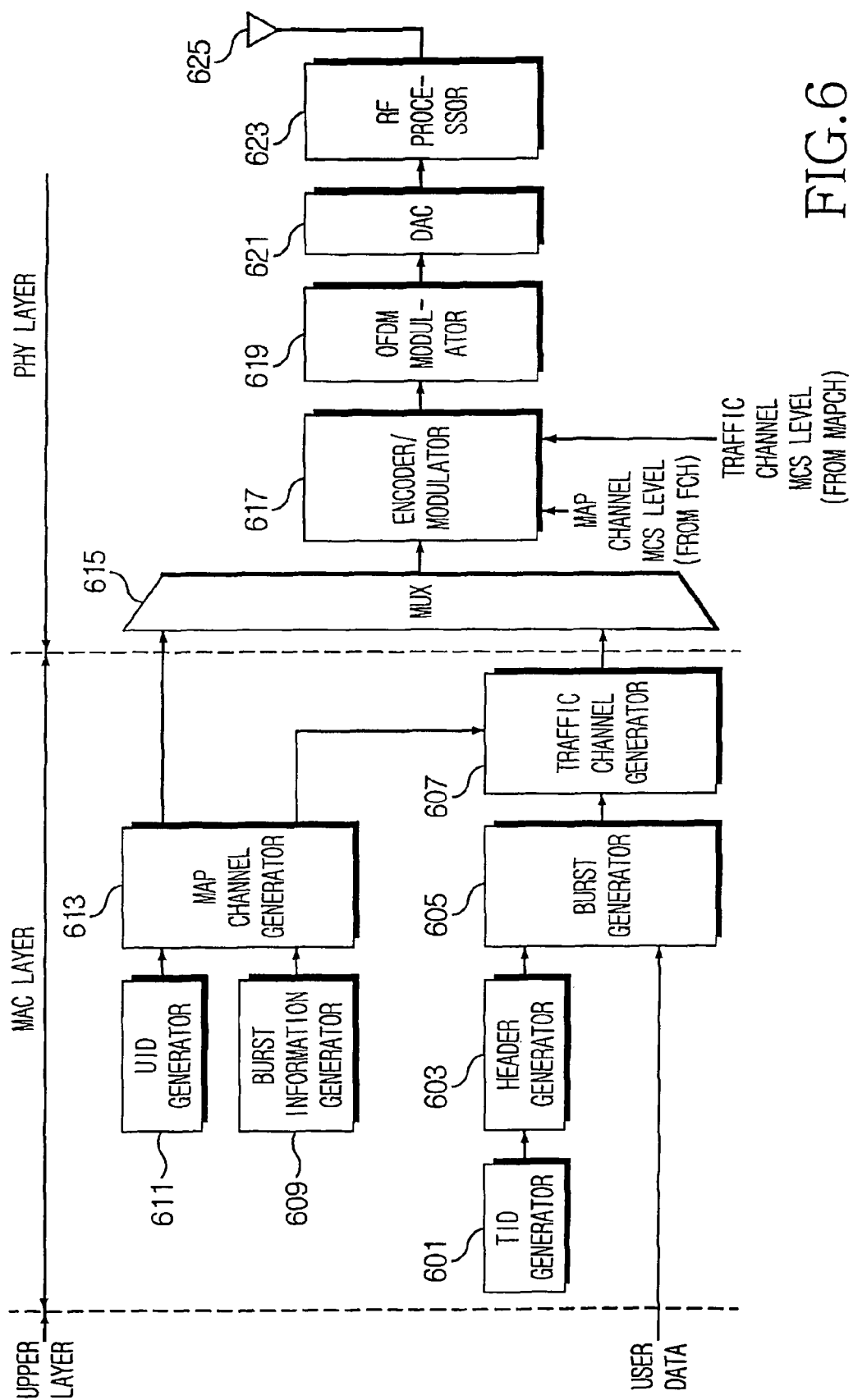
FIG. 6 is a block diagram of a transmitter in the OFDMA system according to an exemplary embodiment of the present invention.

FIG. 6 is a block diagram of a transmitter in the OFDMA system according to an exemplary embodiment of the present invention.

Referring to FIG. 6, the transmitter includes an upper layer, a MAC layer, and a physical layer. The MAC layer includes a TID generator 601, a header generator 603, a burst generator 605, a traffic channel generator 607, a burst information generator 609, a UID generator 611, and a map channel generator 613. The physical layer includes a multiplexer 615, an encoder/modulator 617, an OFDM modulator 619, a digital to analog converter (DAC) 621, a RF processor 623 and an antenna 625.

When user packets are transmitted from the upper layer to the MAC layer, the TID generator 601 generates TID indicating the kind of service with respect to each user packet.

The header generator 603 generates a MAC header using the TID information from the TID generator 601 and other control information. The other control information may be encryption information, payload length, information indicating the number of fragmentation when the packet from the upper layer is divided and transmitted, and header error check (HEC).

The burst generator 605 generates the data bursts by adding the header from the header generator 603 to each user packet.

Meanwhile, the MAC layer constructs the map channel to allocate each user packet to a specific area of the time-frequency resource. When arbitrary users access the base station (cell), the base station allocates UIDs to the users. The UID generator 611 manages the UIDs of the users accessing the base station, and generates the UIDs of the users when the user packets are received from the upper layer.

The burst information generator 609 generates the burst information of each data burst transmitted to the current frame. The burst information includes the MCS level used in the corresponding burst, the starting point of the burst (symbol offset, subchannel offset), and the number of the burst (number of symbols, number of the subchannels).

The map channel generator 613 constructs the map information (or the burst allocation information) by collecting the UIDs from the UID generator 611 and the burst information from the burst information generator 609.

The traffic channel generator 607 constructs the traffic channel by aligning the data bursts according to the map information.

The multiplexer 615 first selects the map channel data inputted from the map channel generator 613 according to a preset frame specification and then selects the traffic channel data inputted from the traffic channel generator 607.

The encoder/modulator 617 encodes and modulates the channel data outputted from the multiplexer 615 according to a preset modulation level (MCS level). The map channel is encoded and modulated according to the modulation level designated in a frame control header (FCH). The data burst of the traffic channel is encoded and modulated according to the modulation level designated in the map information.

The OFDM modulator 619 inverse fast Fourier Transform (IFFT)-processes the data outputted from the encoder/modulator 617 to generate sample data (OFDM symbol). The DAC 621 converts the sample data into an analog signal. The RF processor 623 converts the analog signal outputted from the DAC 621 into a radio frequency (RF) signal and transmits the RF signal through the antenna 625.

Figure 7:
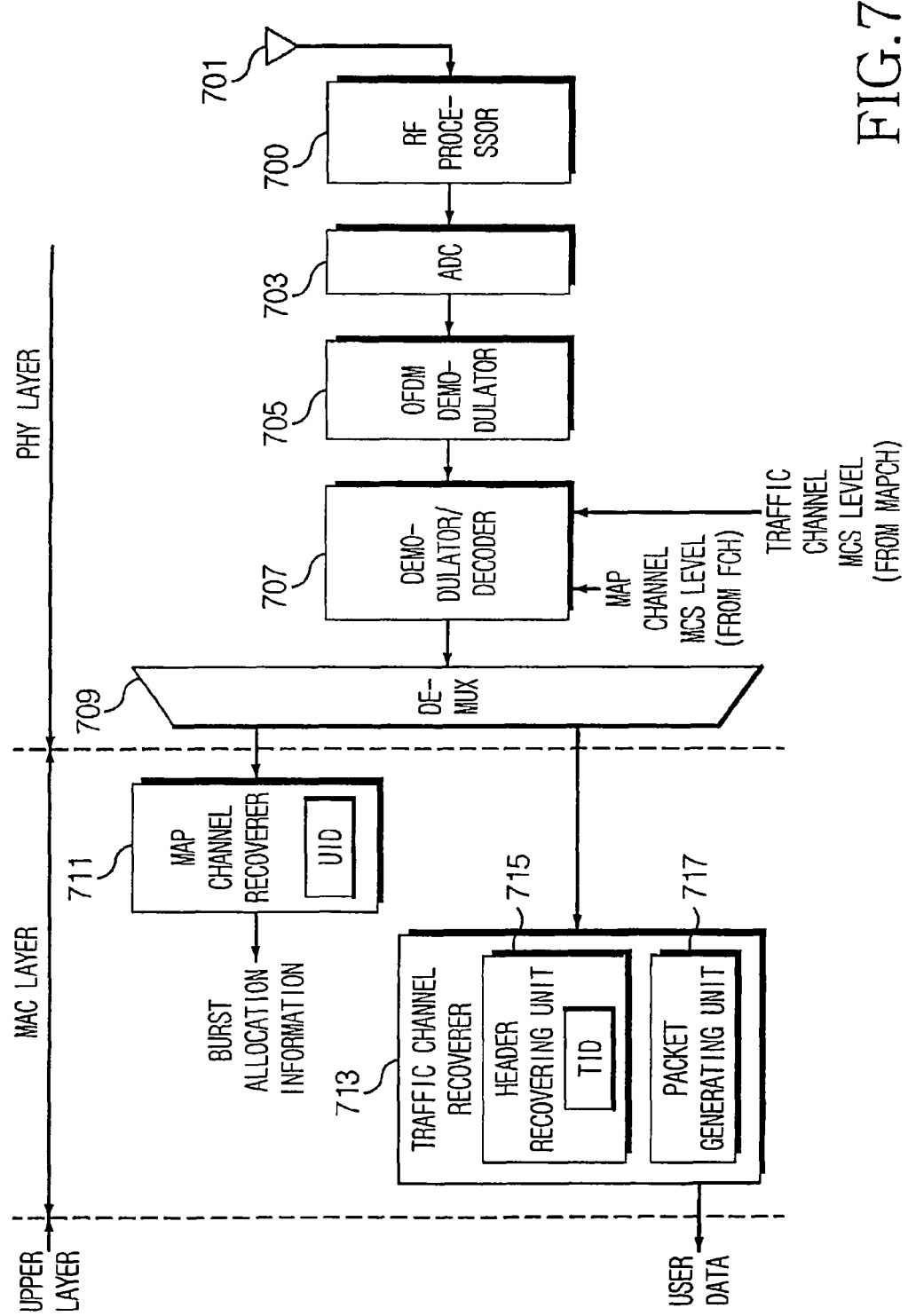
FIG. 7 is a block diagram of a receiver in the OFDMA system according to an exemplary embodiment of the present invention.

FIG. 7 is a block diagram of a receiver in the OFDMA system according to an exemplary embodiment of the present invention.

Referring to FIG. 7, the receiver includes a physical layer, a MAC layer, and an upper layer. The physical layer includes an antenna 701, a RF processor 700, an analog to digital converter (ADC) 703, an OFDM demodulator 705, a demodulator/decoder 707 and demultiplexer 709. The MAC layer includes a map channel recoverer 711 and a traffic channel recoverer 713.

The RF processor 700 converts a RF signal received through the antenna 701 into a baseband analog signal. The ADC 703 converts the baseband analog signal into sample data. The OFDM demodulator 705 FFT-processes the sample data to output a frequency-domain signal.

The demodulator/decoder 707 selects data of subcarriers intended to be received from the frequency-domain data, and demodulates and decodes the selected data according to a preset modulation level (MCS level). The modulation level of the map channel is acquired from the previously received FCH. The location (time-frequency domain) and the modulation level of the traffic data (data burst) are acquired from the previously received map channel.

The demultiplexer 709 transmits the output data of the demodulator/decoder 707 to the map channel recoverer 711 of the MAC layer when the output data is the map channel data, and transmits the output data of the demodulator/decoder 707 to the traffic channel recoverer 713 of the MAC layer when the output data is the traffic data.

The map channel recoverer 711 determines whether the UID of the receiver exists in the map channel data outputted from the physical layer. When the UID exists, the map channel recoverer 711 extracts control information that can receive the traffic data, and transmits the extracted control information to the physical layer. The control information may be the mapped location (time-frequency domain) and modulation level (MCS level) of the corresponding traffic data (data burst). As described above, the control information is provided to the demodulator/decoder 707 of the physical layer.

A header recovering unit 715 of the traffic channel recoverer 713 separates the header from the traffic data (MAC PDU) outputted from the demultiplexer 709, and parses the header to acquire the control information necessary to reassemble the packet. As described above, the control information may be the TID indicating the kind of service, encryption information, payload length or information indicating which number of fragmentation when the SDU is divided.

A packet generating unit 717 of the traffic channel recoverer 713 assembles the traffic data outputted from the demultiplexer 709 into a service packet (for example, SDU) according to the control information outputted from the header recovering unit 715, and transmits the assembled traffic data to the upper layer.

As described above, the CID is subdivided into the UID and the TID. The UID is recorded in the map channel message, and the TID is recorded in the header (MAC header) of the data packet. Therefore, an amount of information contained in a downlink map (DL-MAP) and uplink map (UL-MAP), and an amount of information contained in the header (MAC header) of the data packet can be reduced.

Hereinafter, a Scalable-OFDMA (S-OFDMA) system applied, according to an exemplary embodiment of the present invention, will be described below.

The S-OFDMA system supports a plurality of frequency allocation blocks (FABs), which is well known. The frequency allocation blocks (FABs) will be referred to as subbands.

Figure 8:
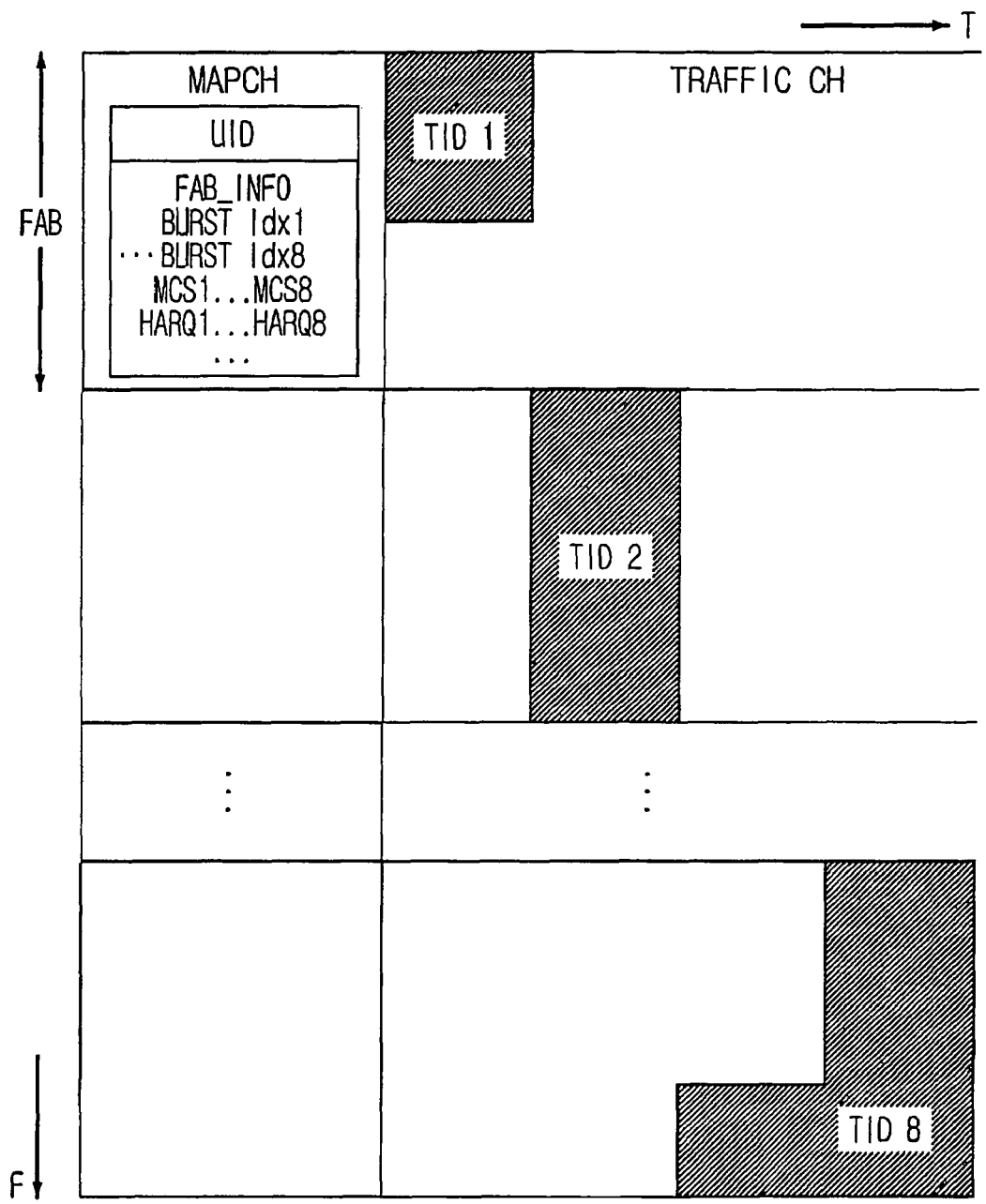
FIG. 8 is a diagram of a map channel structure in an S-OFDMA system according to an exemplary embodiment of the present invention.

FIG. 8 is a diagram of a map channel structure in an S-OFDMA system according to an exemplary embodiment of the present invention the present invention. For example, FIG. 8 illustrates the map channel structure and the burst structure when resources are allocated to an arbitrary user through at least two subbands.

Referring to FIG. 8, when different traffics are transmitted to one user (receiver) through a plurality of subbands, the map information for the user is transmitted through a predetermined subband. In this case, because allocation information of the bursts scattered over several bands are transmitted through the map channel of a specific subband, UID of the user has to be transmitted one time. Therefore, resource waste caused by the duplicate transmission of the UID can be prevented.

To transmit the map channel information of the user allocated several bands through the specific subband, the map channel information has to contain subband allocation information. The subband allocation information is defined as "FAB_INFO". FAB_INFO notifies the number and locations of the subbands the user uses in the entire band. The number of bits necessary for FAB_INFO is determined by the number of subbands constituting the entire band. That is, whether to use the subband is notified to the user by using a bit map scheme.

For example, assuming that the entire band consists of eight subbands, the length of FAB_INFO (length of bit map) is 8 bits. In this case, when FAB_INFO is "10000011", it means that three subbands (first, seventh and eighth subbands) are allocated to the user.

Meanwhile, the remaining information of the map channel is information of the bursts allocated to the user (for example, burst location, burst length, modulation level, and the like). The amount of information is the same whether the information is transmitted through the separate subbands or through the specific subband. Accordingly, it is possible to solve the duplicate transmission of the UID, which is caused when the user uses several bands.

In terms of the amount of resource the UID occupies in the map channel, the case where the map channel information is transmitted through the subbands with respect to one user will be compared with when the map channel information is transmitted through the specific subband.

When the map channel information is transmitted through the subbands, the amount of resource the UID occupies in the map channel is calculated using Equation (5):

$$8 \text{ bits(UID)} \times N(\text{num of FABs}) = 8N \text{ bits} \quad (5)$$

where N represents the number of subbands allocated to an arbitrary user.

Meanwhile, when the map channel information is transmitted one time through the specific subband, the amount of resource the UID and the FAB_INFO occupy in the map channel is calculated using Equation (6):

$$8 \text{ bits(UID)} + N(\text{num of FABs}) = (8+N) \text{bits} \quad (6)$$

When the entire band consists of eight subbands, Equation (6) and Equation (5) yield 16 bits and 64 bits, respectively. According to an exemplary embodiment of the present invention, the amount of resource can be saved by 48 bits.

Figure 9:
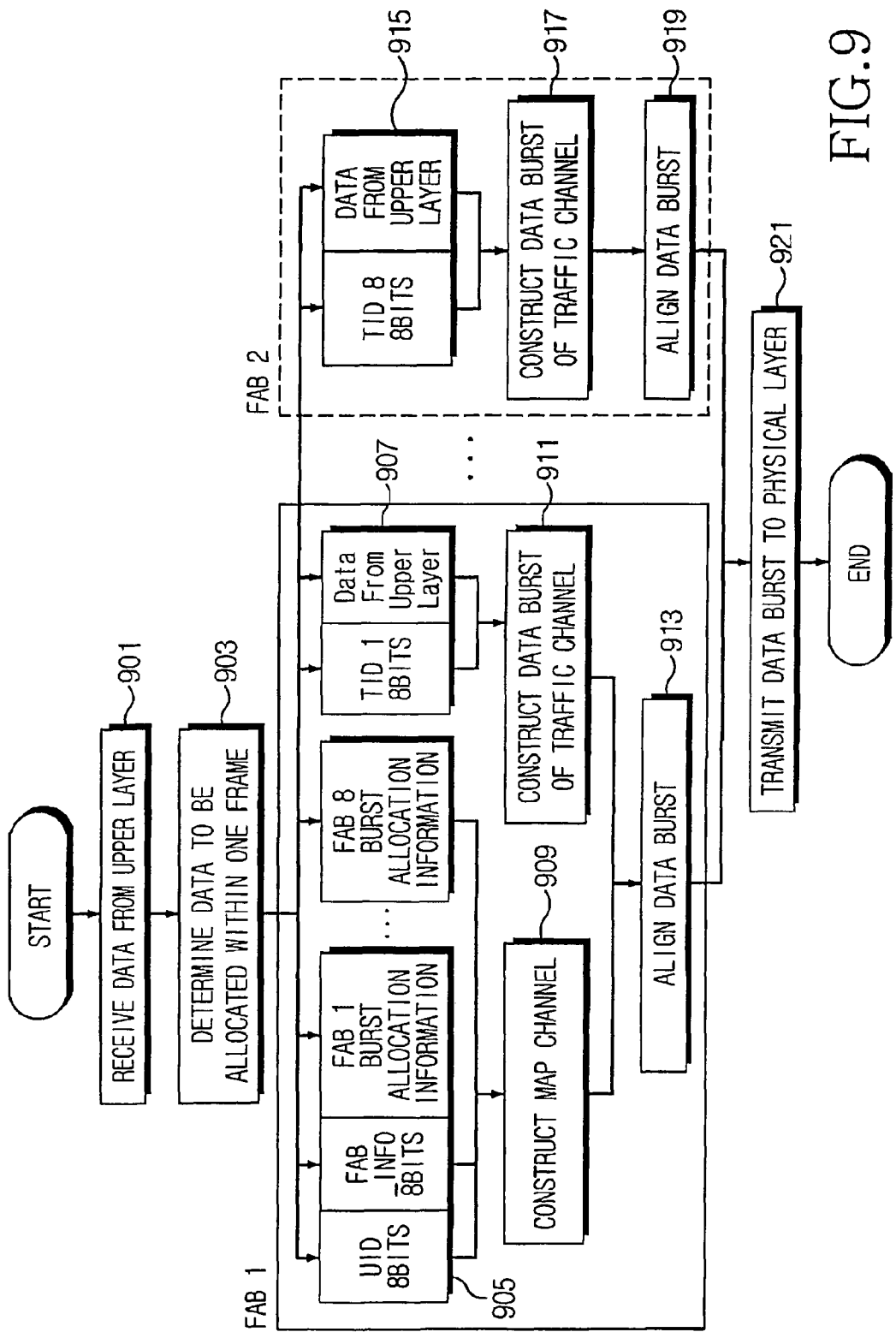
FIG. 9 is a flowchart illustrating a method for constructing a frame in the S-OFDMA system according to an exemplary embodiment of the present invention.

FIG. 9 is a flowchart illustrating a method for constructing a frame in the S-OFDMA system according to an exemplary embodiment of the present invention. For example, data transmission with respect to the user using the entire band (for example, eight subbands) will be described. It is assumed that the map channel information with respect to the user is transmitted through the first subband FAB1. Because the frame is generally constructed in a MAC layer, it will be assumed for convenience of description that all operations are performed in the MAC layer.

Referring to FIG. 9, the MAC layer receives packets with respect to the user using the entire band from an upper layer in step 901. In step 903, the MAC layer determines the packets to be allocated to a current frame through scheduling. At this point, the packets to be allocated to the respective subbands are determined.

Then, the MAC layer constructs the traffic channels for each subband. First, the procedure of constructing the traffic channel for the first subband FAB 1 will be described below. In step 905, the MAC layer generates map information with respect to the user. The map information includes UID (8 bits), FAB_INFO (8 bits), and burst allocation information FAB1 through FAB8 with respect to the user. As described above, the burst allocation information includes the MCS level, the starting point of the burst, and the length of the burst. In step 907, the MAC layer generates TID indicating the kind of service with respect to each packet.

In step 909, the MAC layer constructs the map channel message (DL-MAP_IE) using the map information. In step 911, the MAC layer constructs the data burst by recording the corresponding TID and other control information in the header of each packet. At this point, at least one packet (MAC PDU) transmitted to the same user can be allocated to one data burst.

When the map channel message and the bursts of the traffic channel are constructed, the MAC layer constructs the traffic channel transmitting through the first subband FAB1 by aligning the bursts according to the map channel message in step 913.

Because the map channel information with respect to the user is arranged in the first subband, the map channel information is not transmitted to the remaining subbands. That is, in steps 915 through 919, the traffic channel transmitted through the corresponding subband is constructed by aligning the data bursts in which the TID is recorded in the header, based on the map channel message.

When the traffic channels for the respective subbands are constructed, the MAC layer transmits the traffic channels to a physical layer in step 921. The traffic channels transmitted to the physical layer are processed such that they can be transmitted at a wireless period, and then are transmitted through an antenna.

Figure 10:
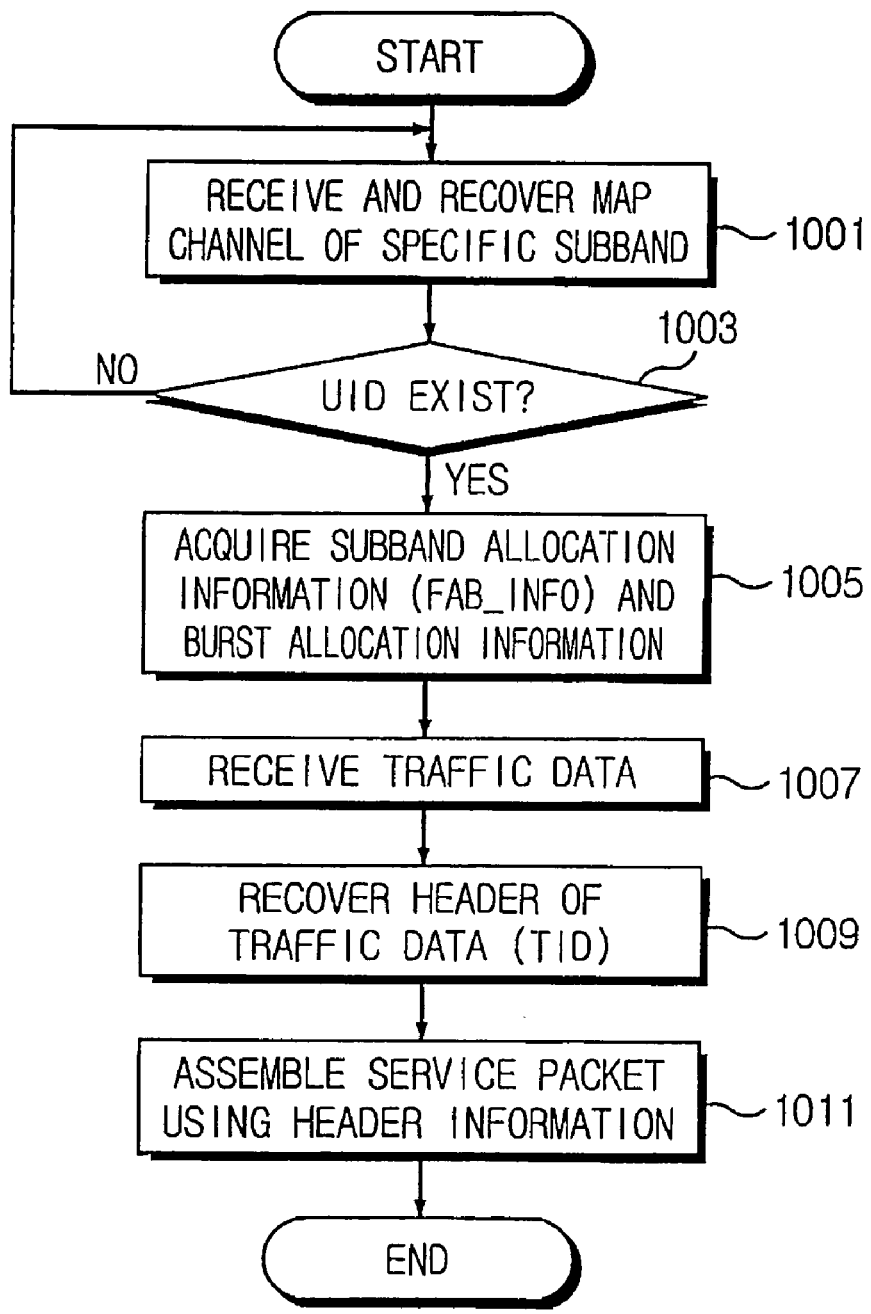
FIG. 10 is a flowchart illustrating a method for receiving a frame in the S-OFDMA system according to an exemplary embodiment of the present invention.

FIG. 10 is a flowchart illustrating a method for receiving a frame in the S-OFDMA system according to the present invention. Specifically, data reception through the entire band (for example, eight subbands) will be described.

Referring to FIG. 10, a receiver receives a map channel in a preset domain (time-frequency domain) of a specific subband and recovers information of the received map channel in step 1001. The information recovery of the map channel is performed in the MAC layer. The base station can notify in advance the specific subband to the user. If the specific subband has not been notified, the receiver receives the map channel with respect to the entire band, and recovers the map information containing its own UID.

In step 1003, the receiver determines whether the UID allocated from the base station (cell) exists in the information of the map channel. When the UID does not exist, the process returns to step 1001 to receive a next frame.

In step 1005, when the UID exists, the receiver extracts information (FAB_INFO) and burst allocation information of the subbands on which the traffic data (packet) of the receiver is loaded. The burst allocation information includes the MCS level used in the burst, the starting point of the burst, and the length of the burst.

In step 1007, the receiver adjusts a carrier such that the subbands can be received, and then receives the traffic data using the burst allocation information. That is, the traffic data is received by demodulating and decoding the data bursts received through the corresponding time-frequency domain according to the MCS level.

In step 1009, the receiver acquires TID indicating the kind of service and other control information by recovering the header of the received traffic data. The information recovery of the header is performed in the MAC layer.

In step 1011, the receiver assembles the received traffic data into a service packet by using the header information, and processes the service packet through a corresponding upper layer (for example, IP layer).

Figure 11:
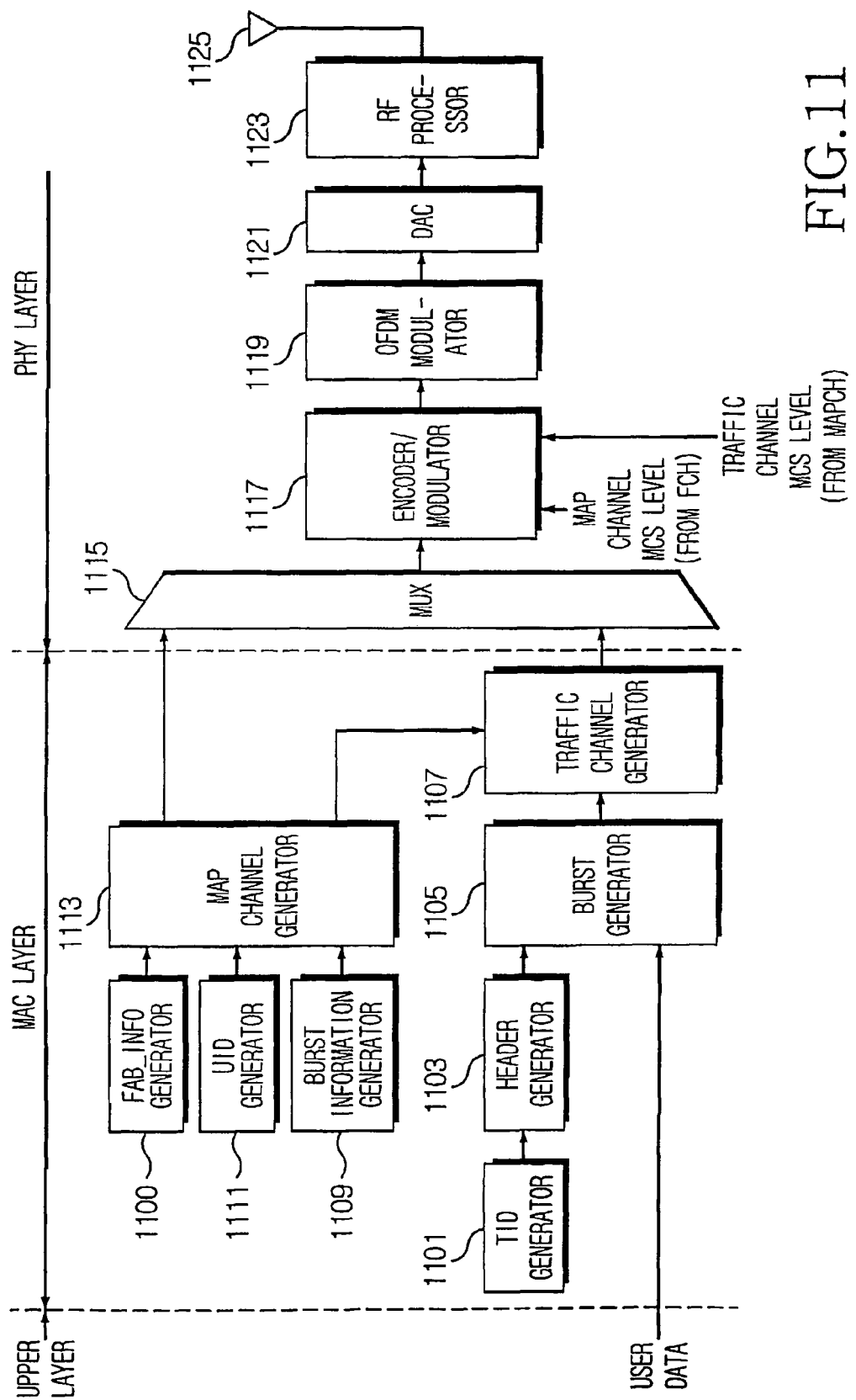
FIG. 11 is a block diagram of a transmitter in the S-OFDMA system according to an exemplary embodiment of the present invention.

FIG. 11 is a block diagram of a transmitter in the S-OFDMA system according to an exemplary embodiment of the present invention.

Referring to FIG. 11, the transmitter includes an upper layer, a MAC layer, and a physical layer. The MAC layer includes a TID generator 1101, a header generator 1103, a burst generator 1105, a traffic channel generator 1107, a burst information generator 1109, a UID generator 1111, a subband allocation information (FAB_INFO) generator 1100, and a map channel generator 1113. The physical layer includes a multiplexer 1115, an encoder/modulator 1117, an OFDM modulator 1119, a digital to analog converter (DAC) 1121, a RF processor 1123, and an antenna 1125.

When packets of users using several subbands are transmitted from the upper layer to the MAC layer, the TID generator 1101 generates TID indicating the kind of service with respect to each user packet.

The header generator 1103 generates a MAC header using the TID information from the TID generator 1101 and other control information. The other control information may be encryption information, payload length, information indicating the number of fragmentations when the packet from the upper layer is divided and transmitted, and header error check (HEC), The burst generator 1105 generates the data bursts by adding the header from the header generator 1103 to each packet.

Meanwhile, the MAC layer constructs the map channel to allocate each packet to a specific area of the time-frequency resource. When arbitrary users access the base station (cell), the base station allocates UIDs to the users. The UID generator 1111 manages the UIDs of the users accessing the base station, and generates the UIDs of the users when the user packets are received from the upper layer.

The subband allocation information (FAB_INFO) generator 1100 generates information of the subbands allocated to the user, based on a bit map scheme. For example, when the entire band consists of eight subbands (FABs), the bit map is constructed with 8 bits, and a value of each bit represents whether to allocate the corresponding subband.

The burst information generator 1109 generates time-frequency resource information allocated to each packet, and the burst information including the modulation level (for example, MCS level). The map channel generator 1113 constructs the map information (or the burst allocation information) by collecting the subchannel allocation information (bit map) from the subband allocation information generator 1100 and the burst information from the burst information generator 1109.

The traffic channel generator 1107 constructs the traffic channel by aligning the data bursts according to the map information.

The multiplexer 1115 first selects the map channel data inputted from the map channel generator 1113 according to a preset frame specification and then selects the traffic channel data inputted from the traffic channel generator 1107.

The encoder/modulator 1117 encodes and modulates the channel data outputted from the multiplexer 1115 according to a preset modulation level (MCS level). The map channel is encoded and modulated according to the modulation level designated in the FCH. The data burst of the traffic channel is encoded and modulated according to the modulation level designated in the map information.

The OFDM modulator 1119 IFFT-processes the data outputted from the encoder/modulator 1117 to generate sample data (OFDM symbol). The DAC 1121 converts the sample data into an analog signal. The RF processor 1123 converts the analog signal outputted from the DAC 1121 into a RF signal and transmits the RF signal through the antenna 1125.

Figure 12:
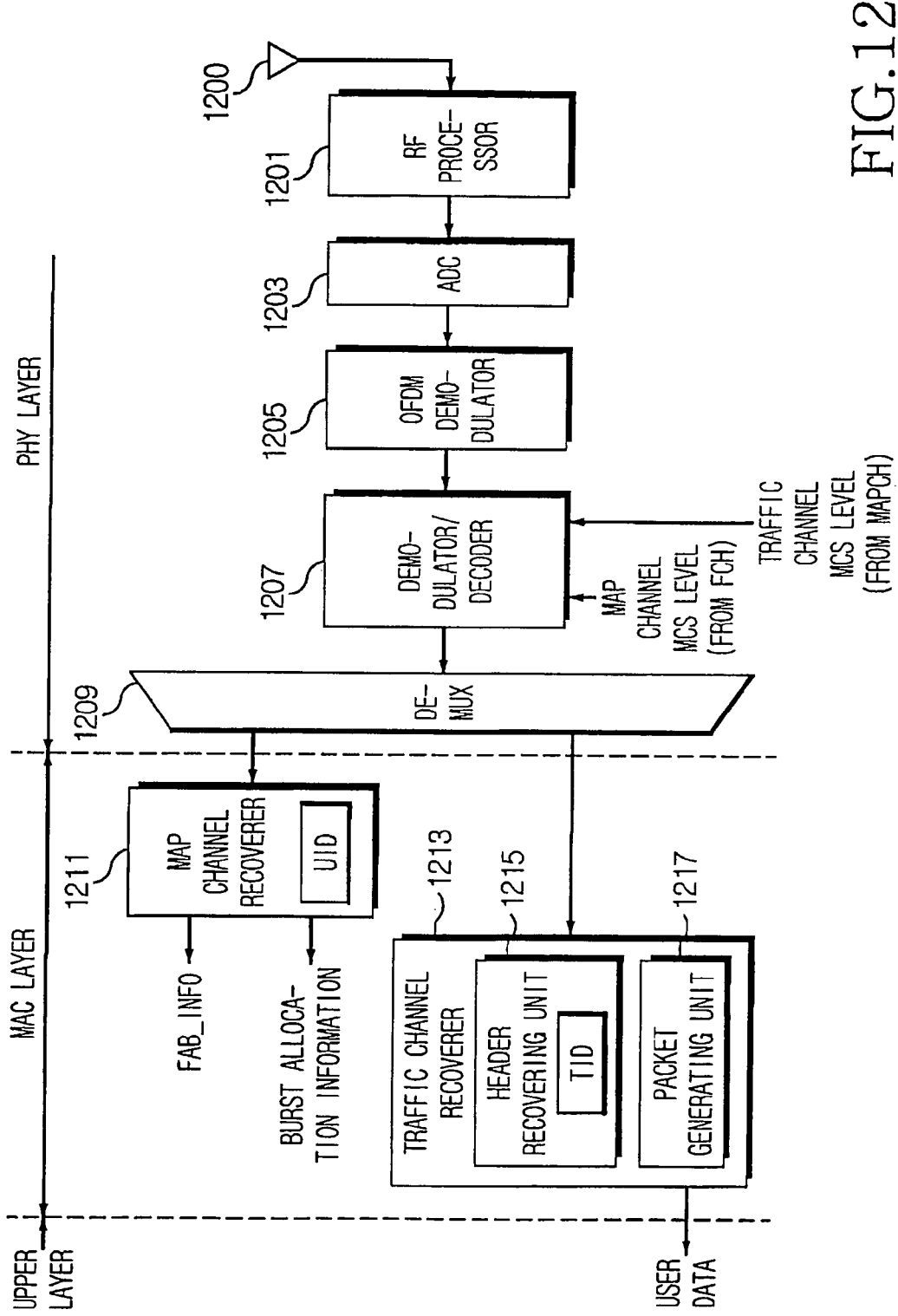
FIG. 12 is a block diagram of a receiver in the S-OFDMA system according to an exemplary embodiment of the present invention.

FIG. 12 is a block diagram of a receiver in the S-OFDMA system according to an exemplary embodiment of the present invention.

Referring to FIG. 12, the receiver includes a physical layer, a MAC layer, and an upper layer. The physical layer includes an antenna 1200, a RF processor 1201, an analog to digital converter (ADC) 1203, an OFDM demodulator 1205, a demodulator/decoder 1207 and a demultiplexer 1209. The MAC layer includes a map channel recoverer 1211 and a traffic channel recoverer 1213.

The RF processor 1201 converts a RF signal received through the antenna 1200 into a baseband analog signal. It is assumed that the receiver is a terminal that can use the entire band of the base station supporting the S-OFDMA. That is, the receiver can receive data at any subbands of the base station. The ADC 1203 converts the baseband analog signal into sample data. The OFDM demodulator 1205 FFT-processes the sample data to output a frequency-domain signal.

The demodulator/decoder 1207 selects data of subcarriers intended to be received from the frequency-domain data, and demodulates and decodes the selected data according to a preset modulation level (MCS level). The modulation level of the map channel is acquired from the previously received FCH. The location (time-frequency domain) and the modulation level of the traffic data (data burst) are acquired from the previously received map channel. Herein, it is assumed that the map information with respect to the user using several bands is transmitted to the preset subband (for example, FAB1).

The demultiplexer 1209 transmits the output data of the demodulator/decoder 1207 to the map channel recoverer 1211 of the MAC layer when the output data is the map channel data, and transmits the output data of the demodulator/decoder 1207 to the traffic channel recoverer 1213 of the MAC layer when the output data is the traffic data.

The map channel recoverer 1211 determines whether the UID of the receiver exists in the map channel data outputted from the physical layer. When the UID exists, the map channel recoverer 1211 extracts control information that can receive the traffic data, and transmits the extracted control information to the physical layer. The control information may be the subband allocation information (FAB_INFO) to which the traffic data is mapped, and the burst allocation information (MCS level). The receiver adjusts a carrier of a local oscillator included in the RF processor 1201 based on the subband allocation information, and controls the operation of the demodulator/decoder 1207 based on the burst allocation information, A header recovering unit 1215 of the traffic channel recoverer 1213 separates the header from the traffic data (data burst) outputted from the demultiplexer 1209, and parses the header to acquire the control information necessary to reassemble the service packet. As described above, the control information may be the TID indicating the kind of service, encryption information, payload length or information indicating the number of fragmentations when the SDU is divided.

A packet generating unit 1217 of the traffic channel recoverer 1213 assembles the traffic data outputted from the demultiplexer 1209 into a service packet (for example, SDU) according to the control information outputted from the header recovering unit 1215, and transmits the assembled traffic data to the upper layer.

According to the exemplary embodiments of the present invention, the amount of map channel information and the MAC header overhead of the traffic channel can be reduced. In addition, when the present invention is applied to the S-OFDMA system, the amount of map channel information can decrease by reducing the amount of UID transmitted in duplication. That is, the data throughput can increase by efficiently using the limited time-frequency resource.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A transmitter of a wireless communication system, comprising:
   a control channel generating unit for generating burst allocation information including a receiver identification (ID) in accordance with a transmission packet;
   a burst generating unit for constructing data burst by adding a header including a traffic ID to the transmission packet; and
   a transmitting unit for transmitting the burst allocation information and the data burst,
   wherein the burst allocation information contains a location of the data burst which is added in a header including a traffic ID.

2. The transmitter of claim 1, wherein the transmitting unit maps the data burst into a corresponding time-frequency domain according to the burst allocation information.

3. The transmitter of claim 1, wherein the transmitting unit comprises:
   an encoder for encoding and modulating the data burst received from the burst generating unit according to a modulation level designated in the burst allocation information;
   an Orthogonal Frequency Division Multiplexing (OFDM) modulator for mapping the data burst outputted from the encoder into a time-frequency domain designated in the burst allocation information; and
   a radio frequency (RF) processor for converting sample data outputted from the OFDM modulator into RF signal, and transmitting the RF signal through an antenna.

4. The transmitter of claim 1, wherein the burst allocation information comprises at least one of the receiver ID, a modulation level used in the data burst, a starting point of the data burst, and an occupied bandwidth of the data burst.

5. The transmitter of claim 1, wherein the burst allocation information comprises map information.

6. The transmitter of claim 1, wherein the header comprises a medium access control (MAC) header.

7. A receiver of a wireless communication system, comprising:
   a control channel recovering unit for recovering information of a received control channel, determining whether a receiver identification (ID) exists in the recovered information, and acquiring allocation information of a data burst, which is to be inputted to the receiver, using the information of the control channel when the receiver ID exists;
   a receiving unit for receiving traffic data in a corresponding time-frequency domain according to the acquired allocation information; and
   a traffic recovering unit for acquiring a traffic ID by recovering a header of the received traffic data,
   wherein the traffic data includes the data burst and the header,
   wherein the allocation information of the data burst contains a location of the traffic data.

8. The receiver of claim 7, wherein the receiving unit comprises:
   a radio frequency (RF) processor for converting a RF signal received through an antenna into a baseband signal;
   an Orthogonal Frequency Division Multiplexing (OFDM) demodulator for fast Fourier transform (FFT)-processing the baseband signal to output frequency-domain data; and
   a decoder for extracting data based on a time-frequency domain from the frequency-domain data outputted from the OFDM demodulator, and demodulating and decoding the extracted data according to a modulation level designated in the allocation information.

9. The receiver of claim 7, wherein the traffic recovering unit comprises:
   a header recovering unit for recovering a header of the received traffic data to generate control information; and a packet recovering unit for assembling the received traffic data into a service packet by using the control information, and transmitting the assembled data to an upper layer.

10. The receiver of claim 7, wherein the allocation information of the data burst comprises at least one of the receiver ID, a modulation level used in the data burst, a starting point of the data burst, and an occupied bandwidth of the data burst.

11. The receiver of claim 7, wherein the header comprises a medium access control (MAC) header.

12. A transmitter of a wireless communication system in which an entire band is divided into a plurality of subbands, comprising:
   a control channel generating unit for generating resource allocation information including a receiver identification (ID) in accordance with a receiver to which at least one subband is allocated;
   a burst generating unit for constructing data bursts by adding a header including a traffic ID to each packet to be transmitted to the receiver; and
   a transmitting unit for transmitting the resource allocation information and the data bursts,
   wherein the resource allocation information contains a location of the data burst which is added in a header including a traffic ID.

13. The transmitter of claim 12, wherein the transmitting unit maps the data bursts into a time-frequency domain of a corresponding subband according to the resource allocation information.

14. The transmitter of claim 12, wherein the transmitting unit comprises:
   an encoder for encoding and modulating the data bursts received from the burst generating unit according to a modulation level designated in the resource allocation information;
   an Orthogonal Frequency Division Multiplexing (OFDM) modulator for mapping the data bursts outputted from the encoder into a time-frequency domain designated in the corresponding subbands; and
   a radio frequency (RF) processor for converting sample data outputted from the OFDM modulator into RF signal, and transmitting the RF signal.

15. The transmitter of claim 12, wherein the resource allocation information comprises at least one of the receiver ID, subband allocation information, and resource information of the data bursts.

16. The transmitter of claim 15, wherein the subband allocation information comprises information for allocating the subbands into which the data bursts are mapped in a bit map scheme.

17. The transmitter of claim 12, wherein the header comprises a medium access control (MAC) header.

18. A receiver of a wireless communication system in which an entire band is divided into a plurality of subbands, comprising:
   a control channel recovering unit for recovering information of a received control channel, determining whether a receiver identification (ID) exists in the recovered information, and acquiring resource allocation information of data bursts, which are to be inputted to the receiver, using the information of the control channel when the receiver ID exists;
   a receiving unit for receiving traffic data in at least one subband according to the acquired resource allocation information; and
   a traffic recovering unit for acquiring traffic IDs by recovering headers of the received traffic data,
   wherein the traffic data includes the data burst and the header,
   wherein the resource allocation information contains a location of the traffic data.

19. The receiver of claim 18, wherein the receiving unit comprises:
   a radio frequency (RF) processor for converting a RF signal received through an antenna into a baseband signal;
   an Orthogonal Frequency Division Multiplexing (OFDM) demodulator for fast Fourier transform (FFT)-processing the baseband signal to output frequency-domain data; and
   a decoder for extracting traffic data based on the resource allocation information from the frequency-domain data outputted from the OFDM demodulator, and demodulating and decoding the extracted traffic data according to a modulation level designated in the resource allocation information.

20. The receiver of claim 18, wherein the traffic recovering unit comprises:
   a header recovering unit for recovering headers of the received traffic data to generate control information; and
   a packet recovering unit for assembling the received traffic data into a service packet by using the control information, and transmitting the assembled data to an upper layer.

21. The receiver of claim 18, wherein the resource allocation information comprises at least one of the receiver ID, subband allocation information, and resource information of the data bursts.

22. The receiver of claim 18, wherein the header comprises a medium access control (MAC) header.

23. A transmitting method in a wireless communication system, the method comprising:
   generating burst allocation information, at a transmitter, including a receiver identification (ID) in accordance with a transmission packet, and transmitting the burst allocation information;
   constructing data burst by adding a header including a traffic ID to the transmission packet; and
   mapping the data burst into a corresponding resource area according to the burst allocation information, and transmitting the mapped data burst,
   wherein the burst allocation information contains a location of the data burst which is added in a header including a traffic ID.

24. The transmitting method of claim 23, wherein the transmitting of the data burst comprises:
   encoding and modulating the data burst according to a modulation level designated in the burst allocation information;
   performing an Orthogonal Frequency Division Multiplexing (OFDM)-modulation to map the modulated data into a time-frequency domain designated in the burst allocation information; and
   converting the OFDM-modulated data into a RF signal, and transmitting the RF signal through an antenna.

25. The transmitting method of claim 23, wherein the burst allocation information comprises at least one of the receiver ID, a modulation level used in the data burst, a starting point of the data burst, and an occupied bandwidth of the data burst.

26. The transmitting method of claim 23, wherein the burst allocation information comprises map information.

27. The transmitting method of claim 23, wherein the header comprises a medium access control (MAC) header.

28. A receiving method in a wireless communication system, the method comprising:

recovering, at a receiver, information of a received control channel, and determining whether a receiver identification (ID) exists in the recovered information;

when the receiver ID exists in the recovered information, acquiring allocation information of a data burst, which is to be inputted to the receiver, using the information of the control channel;

receiving traffic data in a corresponding time-frequency domain according to the acquired allocation information; and acquiring a traffic ID by recovering a header of the received traffic data, wherein the traffic data includes the data burst and the header, wherein the allocation information of the data burst contains a location of the traffic data.

29. The receiving method of claim 28, wherein the receiving of the traffic data comprises:

converting a radio frequency (RF) signal received through an antenna into a baseband signal;

fast Fourier transform (FFT)-processing the baseband signal to output frequency-domain data; and extracting data based on the time-frequency domain from the frequency-domain data; and demodulating and decoding the extracted data according to a modulation level designated in the allocation information.

30. The receiving method of claim 28, wherein the allocation information of the data burst comprises at least one of the receiver ID, a modulation level used in the data burst, a starting point of the data burst, and an occupied bandwidth of the data burst.

31. The receiving method of claim 28, wherein the header comprises a medium access control (MAC) header.

32. A transmitting method in a wireless communication system in which an entire band is divided into a plurality of subbands, the method comprising:

generating resource allocation information, at a transmitter, including a receiver identification (ID) in accordance with a receiver to which at least one subband is allocated;

constructing data bursts by adding a header including a traffic ID to each packet to be transmitted to the receiver; and mapping the data bursts into corresponding resource areas according to the resource allocation information, and transmitting the mapped data bursts, wherein the resource allocation information contains a location of the data burst which is added in a header including a traffic ID.

33. The transmitting of claim 32, wherein the step of transmitting the data bursts comprises:

encoding and modulating the data bursts according to a modulation level designated in the resource allocation information;

performing an Orthogonal Frequency Division Multiplexing (OFDM) modulation to map the modulated data bursts into a time-frequency domain of the corresponding subbands; and converting the OFDM-modulated data into a radio frequency (RF) signal, and transmitting the RF signal.

34. The transmitting method of claim 32, wherein the resource allocation information comprises at least one of the receiver ID, subband allocation information, and resource information of the data bursts.

35. The transmitting method of claim 32, wherein the header comprises a medium access control (MAC) header.

36. A receiving method in a wireless communication system in which an entire band is divided into a plurality of subbands, the method comprising:

recovering, at a receiver, information of a received control channel, and determining whether a receiver identification (ID) exists in the recovered information;

when the receiver ID exists, acquiring resource allocation information of data bursts, which are to be inputted to the receiver, using the information of the control channel;

receiving traffic data in at least one subband according to the acquired resource allocation information; and acquiring traffic IDs by recovering headers of the received traffic data, wherein the traffic data includes the data burst and the header, wherein the allocation information of the data burst contains a location of the traffic data.

37. The receiving method of claim 36, wherein the receiving of the traffic data comprises:

converting a radio frequency (RF) signal received through an antenna into a baseband signal;

fast Fourier transform (FFT)-processing the baseband signal to output frequency-domain data; and extracting traffic data based on the resource allocation information from the frequency-domain data, and demodulating and decoding the extracted traffic data according to a modulation level designated in the resource allocation information.

38. The receiving method of claim 36, wherein the header comprises a medium access control (MAC) header.

39. A wireless communication system comprising:

a transmitter comprising a control channel generating unit for generating burst allocation information including a receiver identification (ID) in accordance with a transmission packet, a burst generating unit for constructing a data burst by adding a header including a traffic ID to the transmission packet, and a transmitting unit for transmitting the burst allocation information and the data burst; and a receiver comprising a control channel recovering unit for recovering information of a received control channel, determining whether the receiver ID exists in the recovered information, and acquiring allocation information of the data burst, which is to be inputted to the receiver, using the information of the control channel when the receiver ID exists, wherein the resource allocation information contains a location of the data burst which is added in a header including a traffic ID.

40. The system of claim 39, wherein the transmitting unit maps the data burst into a corresponding time-frequency domain according to the burst allocation information.

41. The system of claim 40, wherein the receiver further comprises:

a receiving unit for receiving traffic data in the corresponding time-frequency domain according to the burst allocation information; and a traffic recovering unit for acquiring a traffic ID by recovering a header of the received traffic data.

42. The system of claim 39, wherein the transmitting unit comprises:

an encoder for encoding and modulating the data burst received from the burst generating unit according to a modulation level designated in the burst allocation information;

an Orthogonal Frequency Division Multiplexing (OFDM) modulator for mapping the data burst outputted from the encoder into a time-frequency domain designated in the burst allocation information; and a radio frequency (RF) processor for converting sample data outputted from the OFDM modulator into RF signal, and transmitting the RF signal through an antenna.

43. The system of claim 41, wherein the receiving unit comprises:

a radio frequency (RF) processor for converting a RF signal received through an antenna into a baseband signal;

an Orthogonal Frequency Division Multiplexing (OFDM) demodulator for fast Fourier transform (FFT)-processing the baseband signal to output frequency-domain data; and a decoder for extracting data based on a time-frequency domain from the frequency-domain data outputted from the OFDM demodulator, and demodulating and decoding the extracted data according to a modulation level designated in the allocation information.

44. The system of claim 39, wherein the burst allocation information comprises map information.

45. The system of claim 41, wherein the traffic recovering unit comprises:

a header recovering unit for recovering a header of the received traffic data to generate control information; and a packet recovering unit for assembling the received traffic data into a service packet by using the control information, and transmitting the assembled data to an upper layer.

46. The system of claim 41, wherein the allocation information of the data burst comprises at least one of the receiver ID, a modulation level used in the data burst, a starting point of the data burst, and an occupied bandwidth of the data burst.

47. The system of claim 41, wherein the header comprises a medium access control (MAC) header.

* * * * *